(12) United States Patent
Babu et al.

(10) Patent No.: US 9,942,358 B2
(45) Date of Patent: Apr. 10, 2018

(54) RECOMMENDING APPLICATIONS

(71) Applicant: Samsung Electronics Co., Ltd., Suwon-si, Gyeonggi-do (KR)

(72) Inventors: Narayan Babu, Bangalore (IN); Nithin John, Kochi (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/246,463

(22) Filed: Aug. 24, 2016

(65) Prior Publication Data

US 2017/0085678 A1  Mar. 23, 2017

Related U.S. Application Data

(63) Continuation of application No. 14/858,365, filed on Sep. 18, 2015.

(51) Int. Cl.
   *G06F 15/16* (2006.01)
   *H04L 29/08* (2006.01)
   (Continued)

(52) U.S. Cl.
   CPC ............ *H04L 67/34* (2013.01); *G06Q 10/10* (2013.01); *G06Q 30/0631* (2013.01);
   (Continued)

(58) Field of Classification Search
   CPC ......... G06Q 10/10; H04L 67/12; H04L 67/20; H04L 67/306; H04L 51/046;
   (Continued)

(56) References Cited

U.S. PATENT DOCUMENTS 8,374,985 B1  2/2013  Das et al.
8,612,470 B1  12/2013  Fushman et al.
(Continued)

FOREIGN PATENT DOCUMENTS

WO   WO-20130147725 A1   10/2013

OTHER PUBLICATIONS

International Search Report and Written Opinion for PCT Application No. PCT/IB2016/055583, dated Feb. 15, 2017, 11 pages.
(Continued)

*Primary Examiner* — David Lazaro
(74) *Attorney, Agent, or Firm* — Jefferson IP Law, LLP

(57) ABSTRACT

A method includes receiving, at data processing hardware, a notification corresponding to an application and associated with a user. The method includes determining, by the data processing hardware, notification data associated with the notification. The notification data includes one or more of sender data, receiver data, subject data, and message data. The method also includes identifying, by the data processing hardware, one or more applications of a collection of applications associated with the user as one or more recommended applications satisfying criteria for a user selection based on the notification data. In addition, the method includes displaying, on a screen in communication with the data processing hardware, a user selectable link for each recommended application. Each user selectable link is associated with an application access mechanism that has a reference to the corresponding recommended application and that indicates a performable operation for the corresponding recommended application.

20 Claims, 7 Drawing Sheets

(51) Int. Cl.
*G06Q 10/10* (2012.01)
*H04L 12/58* (2006.01)
*H04W 4/00* (2018.01)
*G06Q 30/06* (2012.01)
*H04W 88/02* (2009.01)

(52) U.S. Cl.
CPC .............. *H04L 51/22* (2013.01); *H04L 51/24* (2013.01); *H04L 67/26* (2013.01); *H04L 67/306* (2013.01); *H04W 4/003* (2013.01); *H04W 88/02* (2013.01)

(58) Field of Classification Search
CPC ..... H04L 67/303; H04L 51/18; H04L 67/125; H04L 67/141; H04L 67/18
USPC ................................ 709/203, 206; 340/7.58
See application file for complete search history.

(56) References Cited

U.S. PATENT DOCUMENTS

| | | | |
|---|---|---|---|
| 9,195,721 B2 * | 11/2015 | Soto Matamala | G06F 17/3089 |
| 9,213,729 B2 * | 12/2015 | Li | G06F 17/30312 |
| 9,336,278 B2 | 5/2016 | Procopio et al. | |
| 2004/0209607 A1 * | 10/2004 | Stepanich | H04M 1/72522 455/418 |
| 2011/0307354 A1 | 12/2011 | Erman et al. | |
| 2012/0042036 A1 | 2/2012 | Lau et al. | |
| 2012/0204191 A1 * | 8/2012 | Shia | G06Q 10/10 719/318 |
| 2013/0046772 A1 | 2/2013 | Gu et al. | |
| 2013/0185292 A1 | 7/2013 | Li et al. | |
| 2013/0346408 A1 * | 12/2013 | Duarte | G06F 17/30598 707/737 |
| 2014/0325436 A1 * | 10/2014 | Kim | H04M 1/72519 715/790 |
| 2015/0019997 A1 | 1/2015 | Kim et al. | |
| 2015/0142835 A1 | 5/2015 | Jain et al. | |
| 2016/0037481 A1 * | 2/2016 | Won | H04W 68/00 715/771 |
| 2016/0299977 A1 * | 10/2016 | Hreha | G06F 17/30867 |
| 2017/0085677 A1 | 3/2017 | Babu et al. | |

OTHER PUBLICATIONS

U.S. Appl. No. 14/858,365, filed Sep. 18, 2015, Narayan Babu.

* cited by examiner

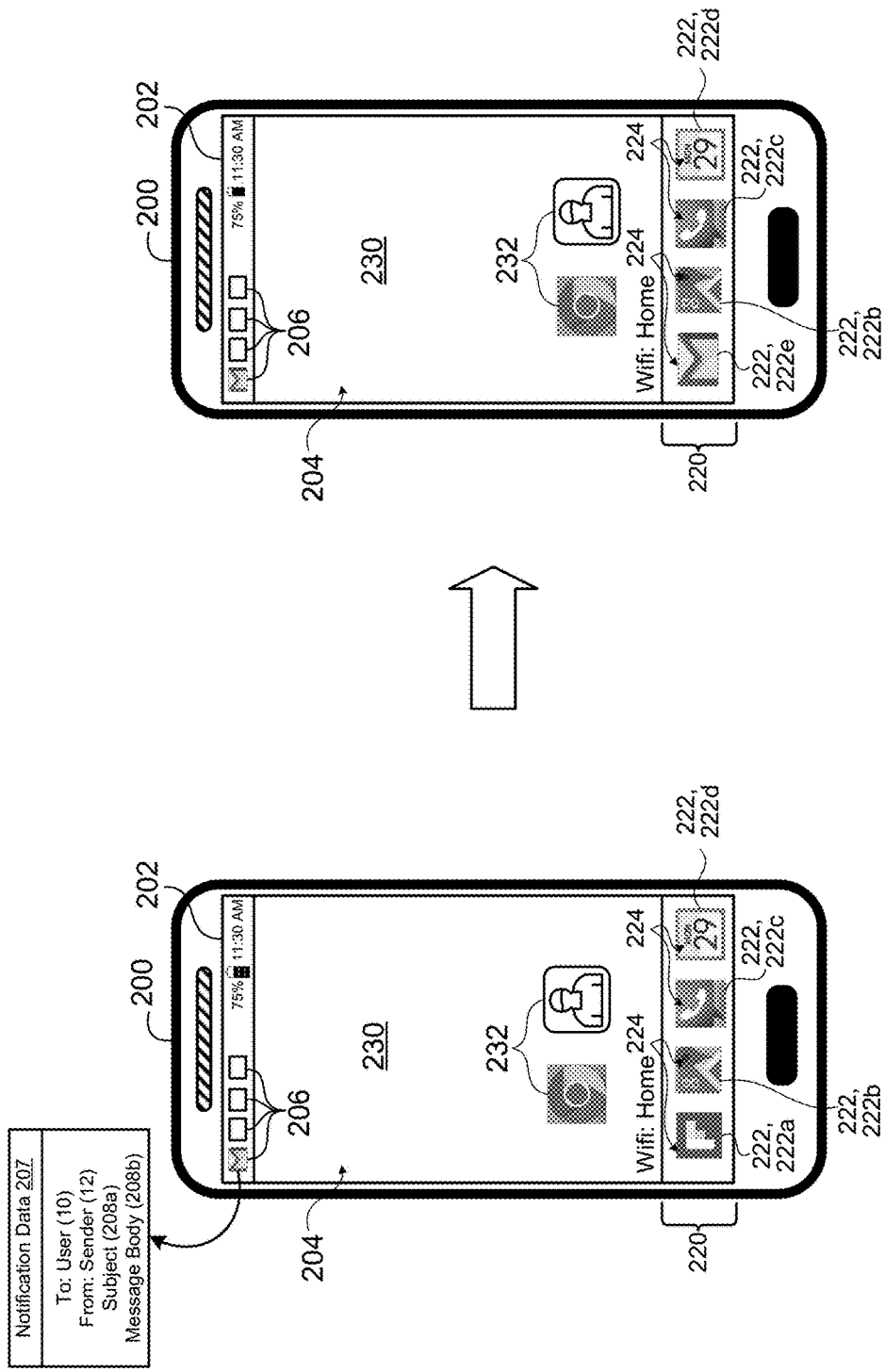

RECOMMENDING APPLICATIONS

CROSS-REFERENCE TO RELATED APPLICATIONS

The present application is a continuation of U.S. patent application Ser. No. 14/858,365, filed on Sep. 18, 2015. The entire disclosure of the application referenced above is incorporated by reference.

FIELD

This disclosure relates to a system for recommending applications on a user device based on one or more received notifications.

BACKGROUND

In recent years, use of computers, smartphones, and other Internet-connected devices has grown exponentially. Correspondingly, the number of available software applications for such devices has also grown. Today, many diverse native and web software applications can be accessed on any number of different devices, including, but not limited to, smartphones, personal computers, automobiles, and televisions. These diverse applications can range from business driven applications, games, educational applications, news applications, shopping applications, messaging applications, media streaming applications, social networking applications, and so much more. Furthermore, application developers develop vast amounts of applications within each genre and each application may have numerous editions.

SUMMARY

One aspect of the disclosure provides a method for recommending applications. The method includes receiving, at data processing hardware (e.g., a user device or a recommendation system), a notification corresponding to an application and associated with a user. The method includes determining, by the data processing hardware, notification data associated with the notification. The notification data may include one or more of sender data, receiver data, subject data, and message data. The method also includes identifying, by the data processing hardware, one or more applications of a collection of applications associated with the user as one or more recommended applications satisfying criteria for a user selection based on the notification data. The method also includes displaying, on a screen in communication with the data processing hardware, a user selectable link for each recommended application. Each user selectable link is associated with an application access mechanism that has reference to the corresponding recommended application and that indicates a performable operation for the corresponding recommended application.

Implementations of the disclosure may include one or more of the following optional features. In some implementations, the notification includes one or more of an email notification, a text message notification, a calendar notification, and an application notification.

In some examples, identifying the one or more applications of the collection of applications as the one or more recommended applications satisfying the criteria for the user selection includes identifying, by the data processing hardware, one or more keywords associated with the one or more applications of the collection of applications. In addition, identifying the one or more applications of the collection of applications as the one or more recommended applications satisfying the criteria for the user selection includes determining, by the data processing hardware, whether the notification data includes the one or more keywords, and identifying the one or more applications as the one or more recommended applications when the notification data includes the one or more keywords.

The criteria for the user selection may include having a threshold probability of the user selection within a threshold period of time after receiving the notification. In some examples, for each application of the collection of applications, the method includes determining, by the data processing hardware, a probability of the user selection of the application within the threshold period of time after receiving the notification, and identifying the application as a recommended application when the probability of the user selection of the application satisfies the threshold probability.

In some implementations, the criteria for the user selection includes at least one of a time of day, a day of week, a location, a user device service status, a user device movement status, a device platform, or contextual information. The method may also include determining, by the processing hardware, user behavior patterns with respect to the collection of applications based on the criteria. For each application of the collection of applications, the method may include determining, by the processing hardware, a probability of the user selection of the application after receiving the notification based on the user behavior patterns, and identifying, by the data processing hardware, the application as a recommended application when the probability of the user selection of the application satisfies a probability criterion. In some examples, the method further includes determining the probability of the user selection of the application based on user behavior patterns of another user. The user behavior patterns include at least one of selecting an application of the collection of applications or performing one or more operations on an application of the collection of applications.

The method may also include receiving, at the data processing hardware, an indication of a user selection of one of the one or more user selectable links and executing, at the data processing hardware, the application access mechanism associated with the selected user selectable link. The executed application access mechanism associated with the selected user selectable link launches the corresponding recommended application and sets the recommended application to an application state specified by the application access mechanism.

Another aspect of the disclosure provides a system for recommending applications on a user device. The system includes a data processing hardware (e.g., a user device or a recommendation system) and memory hardware in communication with the data processing hardware. The memory hardware stores instructions that when executed on the data processing hardware cause the data processing hardware to perform operations. The operations include receiving a notification corresponding to an application and associated with a user and determining notification data associated with the notification. The notification data may include one or more of sender data, receiver data, subject data, and message data. The notifications also include identifying one or more applications of a collection of applications associated with the user as one or more recommended applications satisfying criteria for a user selection based on the notification data, and displaying, on a screen in communication with the data processing hardware, a user selectable link for each recommended application. Each user selectable link associated with an application access mechanism has reference to the corresponding recommended application and indicates a performable operation for the corresponding recommended application.

This aspect may include one or more of the following optional features. The notification may include one or more of an email notification, a text message notification, a calendar notification, and an application notification. Identifying the one or more applications of the collection of applications as the one or more recommended applications satisfying the criteria for the user selection may include identifying one or more keywords associated with the one or more applications of the collection of applications, determining whether the notification data includes the one or more keywords, and identifying the one or more applications as the one or more recommended applications when the notification data includes the one or more keywords.

In some implementations, the criteria for the user selection includes having a threshold probability of the user selection within a threshold period of time after receiving the notification. The operations may further include, for each application of the collection of applications, determining a probability of the user selection of the application within the threshold period of time after receiving the notification, and identifying the application as a recommended application when the probability of the user selection of the application satisfies the threshold probability. The criteria for the user selection may include at least one of a time of day, a day of week, a location, a user device service status, a user device movement status, a device platform, or contextual information.

In some examples, the operations further include determining user behavior patterns with respect to the collection of applications based on the criteria. For each application of the collection of applications, the operations may include determining a probability of the user selection of the application after receiving the notification based on the user behavior patterns and identifying the application as a recommended application when the probability of the user selection of the application satisfies a probability criterion. The operations may further include determining the probability of the user selection of the application based on user behavior patterns of another user. In some examples, the user behavior patterns include at least one of selecting an application of the collection of applications or performing one or more operations on an application of the collection of applications.

The operations may further include receiving an indication of a user selection of one of the one or more user selectable links and executing the application access mechanism associated with the selected user selectable link. The executed application access mechanism associated with the selected user selectable link launches the corresponding recommended application and sets the recommended application to an application state specified by the application access mechanism.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

FIGS. 3A-3D are schematic views of example user devices displaying a recommendation bar.

Like reference symbols in the various drawings indicate like elements.

DETAILED DESCRIPTION

The present disclosure provides a system and method for recommending one or more applications to a user based on notifications received by a user device associated with the user. A recommendation system may select one or more recommended applications from a collection of applications associated with the user. For example, the collection of applications may be installed on the user device. The recommendation system may be part of one of the applications installed on the user device or part of a remote system in communication with the user device. The recommendation system receives one or more notifications and identifies one or more applications of the collection of applications as one or more recommended applications that satisfy criteria based on notification data associated with the notification. The recommendation system may cause the user device to display the one or more recommended applications in a recommendation bar on a display of the user device.

The notifications may include, but are not limited to, text messages, application notifications (from applications, RSS feeds, or other sources), reminder notifications, and email messages. In some implementations, the user device includes a display. A graphical user interface (GUI) of the user device renders, on the display, a recommendation portion, such as a recommendation bar. The recommendation bar may include one or more recommended applications that the recommendation system recommends for display. The recommended applications are based on the received notifications; therefore, the recommended applications of the recommendation bar are updated based on the received notifications. In addition, and in some examples, the recommendation system recommends applications based on the user's context data such as, but not limited to, the time of day (TOD), day of week (DOW), and location.

Figure 1:
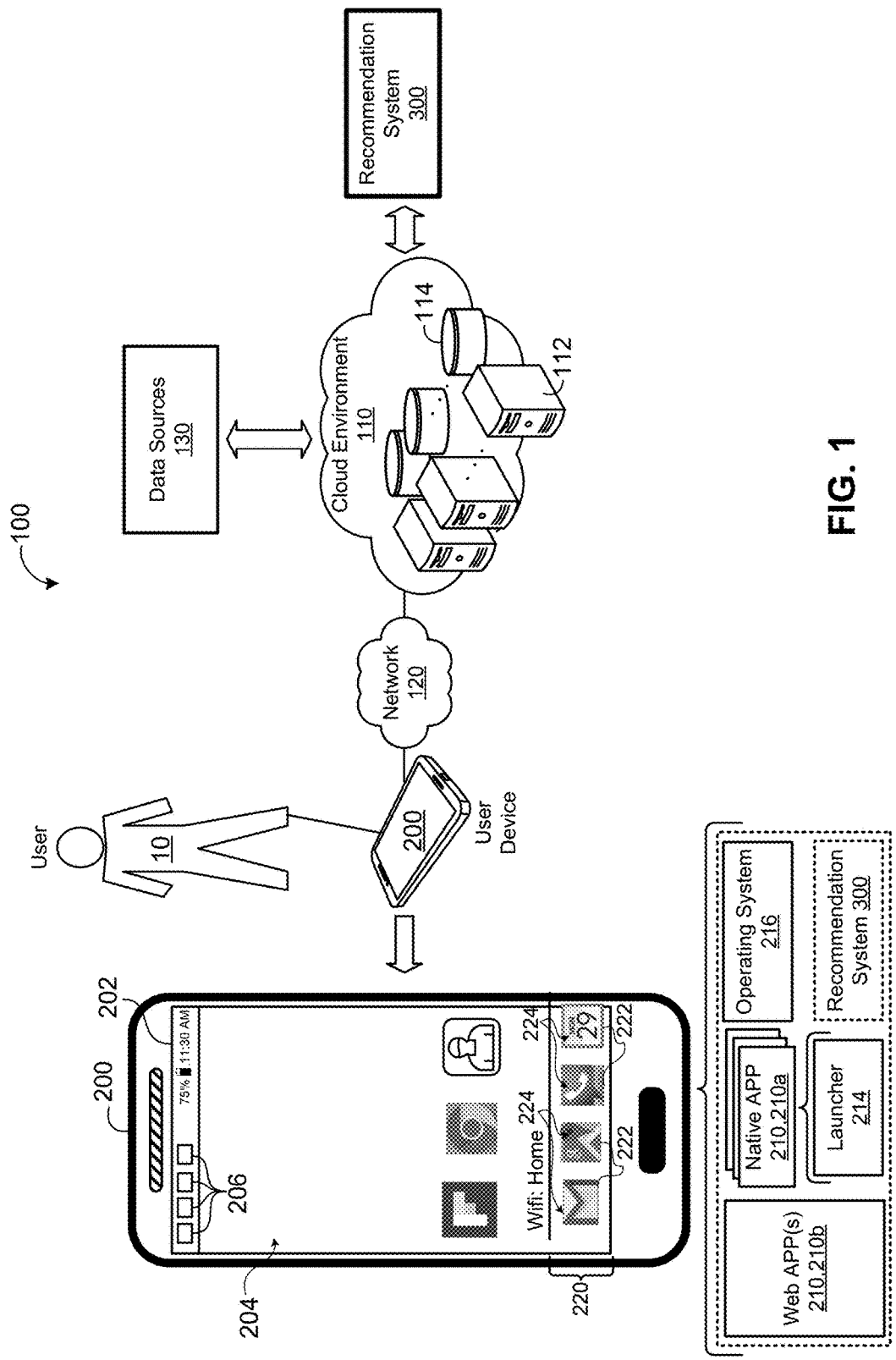
FIG. 1 is a schematic view of an example environment including a user device in communication with a recommendation system.
Figure 2:
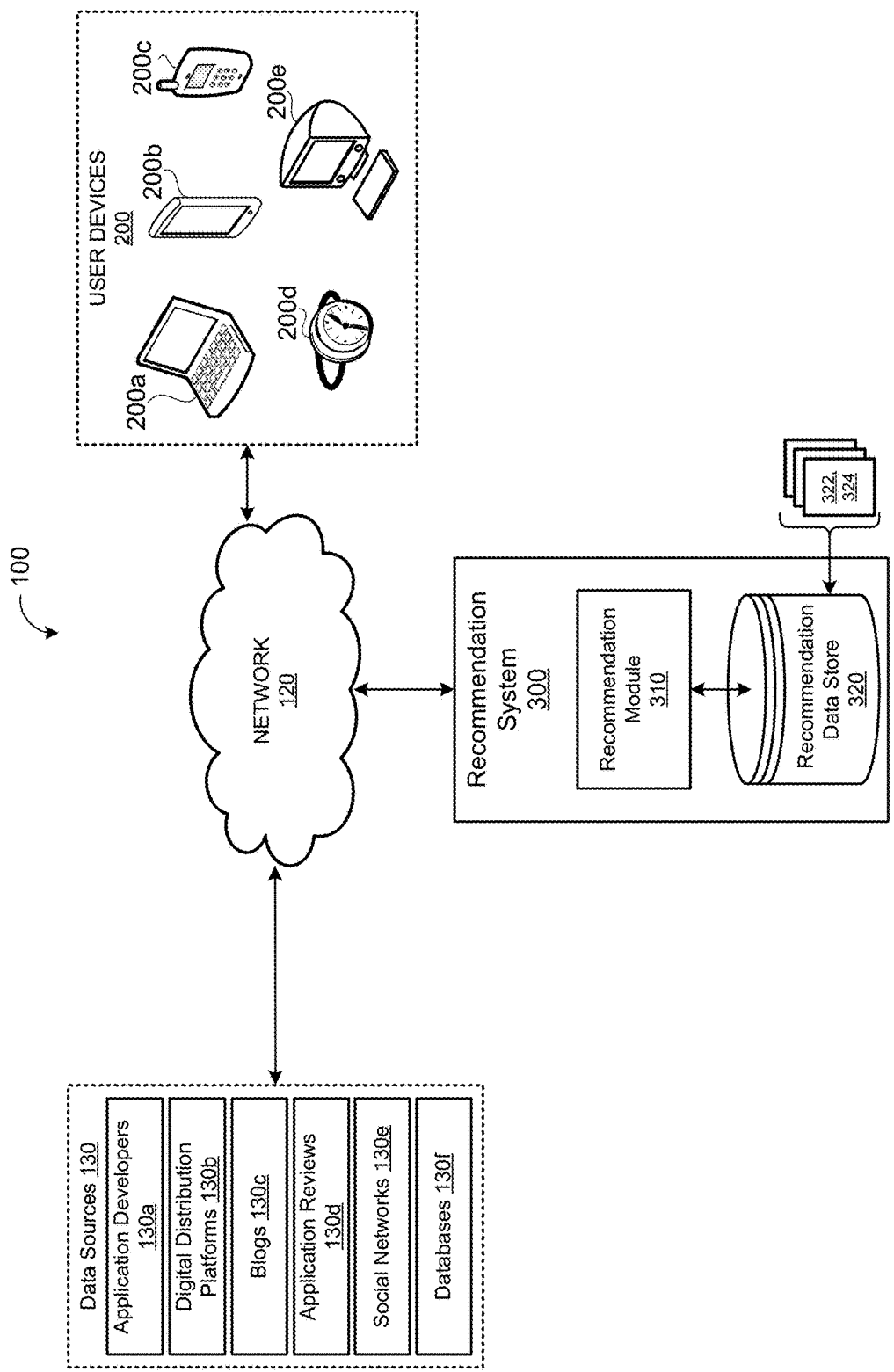
FIG. 2 is a functional block diagram of an example system having a recommendation system that interacts with the user device and data sources.

Referring to FIGS. 1 and 2, in some implementations, a system 100 includes a user device 200 associated with a user 10 in communication with a remote system 110 via a network 120. The remote system 110 may be a distributed system (e.g., cloud environment) having scalable/elastic computing resources 112 and/or storage resources 114. The user device 200 and/or the remote system 110 may implement a recommendation system 300 that optionally receives data from one or more data sources 130 or one or more other user devices 200. In some implementations, the recommendation system 300 communicates with the one or more user devices 200, and the data sources(s) via the network 120. The network 120 may include various types of networks, such as a local area network (LAN), wide area network (WAN), and/or the Internet. As shown, in some implementations, the recommendation system 300 is separate from the user device 200; while in other implementations, the recommendation system 300 executes on the user device 200, as will be discussed with reference to FIG. 4

The data sources 130 may include a variety of different data providers. The data sources 130 may include data from application developers 130a, such as application developers' websites and data feeds provided by developers. The data sources 130 may include operators of digital distribution platforms 130b configured to distribute native applications 210a to user devices 200. Example digital distribution platforms 130b include, but are not limited to, the GOOGLE PLAY® digital distribution platform by Google, Inc., the APP STORE® digital distribution platform by Apple, Inc., and WINDOWS PHONE® Store developed by Microsoft Corporation.

The data sources 130 may also include other websites, such as websites that include web logs 130c (i.e., blogs), application review websites 130d, or other websites including data related to applications 210. Additionally, the data sources 130 may include social networking sites 130e, such as "FACEBOOK®" by Facebook, Inc. (e.g., Facebook posts) and "TWITTER®" by Twitter Inc. (e.g., text from tweets). Data sources 130 may also include online databases 130f that include, but are not limited to, data related to movies, television programs, music, and restaurants. Data sources 130 may also include additional types of data sources in addition to the data sources described above. Different data sources 130 may have their own content and update rate.

A software application 210 may refer to computer software that, when executed by a computing device, causes the computing device to perform a task. In some examples, a software application 210 is referred to as an "application", an "app", or a "program". Example software applications 210 include, but are not limited to, word processing applications, spreadsheet applications, messaging applications, media streaming applications, social networking applications, and games.

The user device 200 may be any computing device capable of displaying on a device display 202 by way of the GUI 204 one or more icons/shortcuts 232 associated with one or more applications 210 installed on the user device 200. In addition, the computing device is capable of executing the one or more installed applications 210. User devices 200 include, but are not limited to, mobile computing devices, such as laptops 200a, tablets 200b, smart phones 200c, and wearable computing devices 200d (e.g., headsets and/or watches). User devices 200 may also include other computing devices having other form factors, such as computing devices included in desktop computers 200e, vehicles, gaming devices, televisions, or other appliances (e.g., networked home automation devices and home appliances).

The user devices 200 may use a variety of different operating systems 216. In examples where a user device 200 is a mobile device, the user device 200 may run an operating system including, but not limited to, ANDROID® developed by Google Inc., IOS® developed by Apple Inc., or WINDOWS PHONE® developed by Microsoft Corporation. Accordingly, the operating system 216 running on the user device 200 may include, but is not limited to, one of ANDROID®, IOS®, or WINDOWS PHONE®. In an example where a user device 200 is a laptop or desktop computing device, the user device 200 may run an operating system including, but not limited to, MICROSOFT WINDOWS® by Microsoft Corporation, MAC OS® by Apple, Inc., or Linux. User devices 200 may also access the recommendation system 300 while running operating systems 216 other than those operating systems 216 described above, whether presently available or developed in the future.

Applications 210 may be executed on a variety of different user devices 200. In some examples, a native application 210a is installed on a user device 200 prior to a user 10 purchasing the user device 200. In other examples, the user 10 may download and install native applications 210a on the user device 200.

The functionality of an application 210 may be accessed on the computing device 200 on which the application 210 is installed. Additionally or alternatively, the functionality of an application 210 may be accessed via a remote computing device 112. In some examples, all of an application's functionality is included on the computing device 112, 200 on which the application 210 is installed. These applications 210 may function without communication with other computing devices 112, 200 (e.g., via the Internet). In other examples, an application 210 installed on a computing device 200 may access information from other remote computing devices 112 during operation. For example, a weather application installed on a computing device 200 may access the latest weather information via the Internet and display the accessed weather information to the user 10 through the installed weather application. In still other examples, a web-based application 210b (also referred to herein as a web application) may be partially executed by the user's computing device 200 and partially executed by a remote computing device 112. For example, a web application 210b may be an application 210 that is executed, at least in part, by a web server and accessed by a web browser (e.g., a native application 210a) of the user's computing device 200. Example web applications 210b may include, but are not limited to, web-based email, online auctions, and online retail sites.

A user 10 may install a multitude of applications 210 on his/her user device 200 and then find it difficult to locate a specific application 210 at any given time. Therefore, it is desirable to monitor the received notifications on the user device 200 and/or learn a usage of the applications 210 associated with the user 10 (e.g. applications 210 installed on the user device 200) and dynamically suggest one or more applications 210 to the user 10 based on one or more factors or criteria, such as, but not limited to, notification data associated with the received notifications a time of day, a location of the user device 200, or any other usage data. Therefore, recommending applications 210 based on the criteria specified may reduce the number of steps that the user 10 may make to open an application 210. The recommendation system 300 may suggest recommended applications 222 for display in a recommendation bar 220 of a graphical user interface (GUI) 204.

In general, the user device 200 may communicate with the recommendation system 300 using any software application 210, such as a recommendation launcher 214, which monitors and analyzes a user's received notifications 206 and provides recommended applications 210, 222 to the user 10. User notifications 206 may include, but are not limited to, text messages, application notifications (from applications, RSS feeds, or other sources), reminder notifications, and email messages. In some examples, the notification 206 may be associated with an entity type that includes, but is not limited to, text, audio, picture, video, or location (e.g., coordinate location or global positioning system (GPS) location). Additionally, the recommendation launcher 214 may also consider the user's usage data 322 to provide recommended applications 210, 222 to the user 10. Usage data 322 may include, but is not limited to, a user's interaction with an application 210, a time/date that a user 10 opens an application 210, duration of using an application 210, a time/date of closing the application 210, frequency of using the application 210, or any other relevant data indicative of the user's interaction with the application 210 via the GUI 204. The recommendation launcher 214 may be an application user interface program that is installed on the user device 200 that replaces a native home screen with a customizable interface allowing the GUI 204 to display a recommendation bar 220 dedicated to displaying recommended applications 222. The recommendation launcher 214 allows the user 10 or the user device 200 (e.g., the recommendation system 300) to personalize a home screen of the GUI 204 of the user device 200. In some implementations, the recommendation launcher 214 also manages a home screen, wallpaper(s), a launch bar, an application installation, shortcuts, and widgets.

In some examples, the user device 200 executes the recommendation launcher 214 that is dedicated to interfacing with the recommendation system 300 (executing on the user device 200 or remotely). The user device 200 may communicate with the recommendation system 300 using a more general application 210, such as a web-browser application 210b accessed using a web browser native application 210a. Although the user device 200 may communicate with the recommendation system 300 using the recommendation launcher 214 and/or a web-browser application 210b, the user device 200 may be described hereinafter as using the recommendation launcher 214 to communicate with the recommendation system 300. In some implementations, the functionality attributed to the recommendation launcher 214 is included as a recommendation component of a larger application 210 that has additional functionality. For example, the functionality attributed to the recommendation launcher 214 may be included as part of a native application 210a or a web application 210b as a feature that provides monitoring capabilities for recommending applications 210, 222.

In some implementations, as shown in FIG. 2, the recommendation system 300 includes a recommendation module 310 in communication with a recommendation data store 320. The recommendation system 300 receives the notifications 206 received by way of the user device 200 of the user 10. In some examples, the recommendation system 300 receives notifications 206 received by multiple user devices 200 associated with multiple users 10. The recommendation system 300 may also receive the usage data 322 of one or more users 10. In some examples, the recommendation system 300 recommends applications 210, 222 for a specific user 10 based on the notifications 206 received by the user device 200 associated with the specific user 10. In other examples, one user 10 may own at least two or more user devices 200 (e.g., laptops 200a, tablets 200b, smart phones 200c, and wearable computing devices 200d (e.g., headsets and/or watches), and a desktop computer 200e)). Therefore, the recommendation system 300 may monitor notifications 206 received on one or more user devices 200 associated with the one user 10. In such a case, each user device 200 executes the recommendation launcher 214 that is dedicated to interfacing with the recommendation system 300. The recommendation system 300 may recommend applications 210, 222 based on all the messages received. In addition, a recommendation made on one user device 200 may be different than a recommendation made on another user device 200. For example, if a user 10 has an IPAD® and an IPHONE®, the user 10 may use the IPAD® mainly for reading while the IPHONE® is mainly used for checking email and making purchases. Therefore, if a user 10 received an email or IPHONE® message that a new book is out, then the recommended application 210, 222 on the user device 200 may be a download application 210 allowing the user 10 to purchase and download the book, while the recommended applications 210, 222 on the IPHONE® may be to read reviews of the book or to purchase the book. In yet another example, the recommendation system 300 receives notifications 206 from multiple users 10 and makes recommended applications 210, 222 based on users 10 having similar installed applications 210 and/or attributes (e.g., user device 200, location, age, gender, etc.).

Figure 3D:
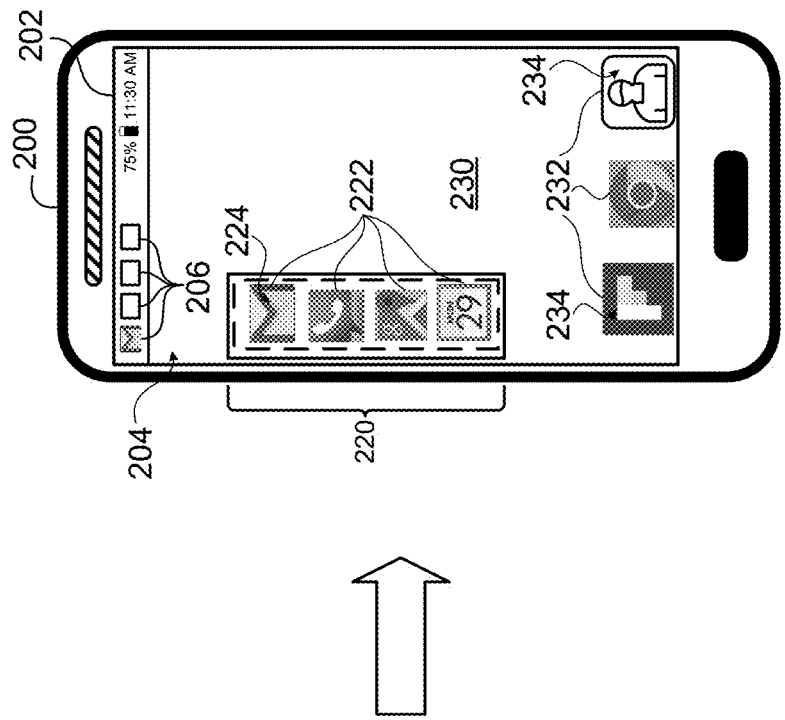

Referring to FIGS. 2-3D, the recommendation module 310 receives the notification(s) 206 and analyzes the notification(s) 206 to determine one or more recommended applications 210, 222 to recommend to the user 10. Some notifications 206, such as a text message notification or an email notification, may be associated with notification data 207. The notification data 207 may include one or more of sender data 12, recipient data (the user 10), subject data 208a, and a message body 208b. The sender 12 may be a known sender 12, i.e., a contact stored on the user device 200 or an unknown sender 12. The unknown sender 12 may be a system associated with an installed application 210 that automatically sends notifications 206 to the user 10. For example, if the user 10 installs the CANDY CRUSH SAGA® application (a match-three puzzle game) on his/her user device 200, the CANDY CRUSH SAGA® application may send the user 10 notifications 206 informing the user 10 of newly added levels and/or if the user 10 has more lives to continue playing the game. In this case, the unknown sender is the CANDY CRUSH SAGA® application. The recommendation module 310 identifies the sender 12 as associated with an application 210 installed on the user device 200, thus recommends the CANDY CRUSH SAGA® application as a recommended application 222 to the user 10. In some examples, the recommendation module 310 recommends additional games similar to CANDY CRUSH SAGA® application, for example, games by the same developer (e.g., King Digital Entertainment), such as, CANDY CRUSH SODA®, PET RESCUE SAGA®, or other games installed on the user device 200.

In another example, if the user 10 provides his/her number to a pharmacy when filling a prescription, the pharmacy may send the user 10 a notification 206, e.g., an email or a text message that informs the user 10 that his/her prescription is ready for pickup. The email or a text message may include a name of the pharmacy and a location. The recommendation module 310 receives the notification 206 and analyses the notification data 207. In this case, since the notification data 207 includes an address, the recommendation module 310 may recommend a map application 222 to the user 10. If the pharmacy has an associated application 210 downloaded on the user device 200, the recommendation module 310 may recommend the application 210 associated with the pharmacy as a recommended application 222.

In some implementations, the notification 206 is from a known sender 12, such as a sender 12 whose contact information is stored on the user device 200. The message subject 208a and/or the message body 208b may include "Meet me at the restaurant," or "Meet me at [location name/address]." In this case, the recommendation module 310 determines that the notification data 207 (e.g., the message body 208b) includes a location and may recommend a map application 210 as the recommended application 222 so that the user 10 may easily find the map application 210 and thus easily determine a route and estimated time of arrival to the specific location included in the notification data 207. In this example, when the user 10 selects the recommended map application 222, the recommended map application 222 may be set to a state displaying a map from the user's current location to the location specified in the notification data 207. Additionally, the recommendation module 310 may also recommend a calendar recommended application 222 so that the user 10 may checks his/her calendar for availability to meet at the specified location. As discussed, each notification 206 may trigger the recommendation system 300 to recommend one or more recommended applications 222. In some examples, a weather notification triggers the recommendation device 300 to recommend a weather recommended application 222. A notification 206 having notification data 207 that includes a flight number may trigger the recommendation module 310 to recommend a flight application 210 that provides the user 10 with more information relating to his/her flight.

The recommendation system 300 may provide recommended application(s) 222 following the receipt of a notification 206 or following a threshold number of notifications 206. In some examples, the recommendation system 300 provides recommended applications(s) 210, 222 every threshold period of time, e.g., every hour. In other examples, the recommendation system 300 provides recommended application(s) 210, 222 after a threshold period of time from making a previous recommendation.

In some implementations, the recommendation system 300 considers a user's contextual information 324, such as but not limited to, the time of day (TOD), day of week (DOW), location, home/roaming (Boolean), driving (fast moving)/stationary (slow moving) (Boolean), device (i.e., IPHONE®, ANDROID®). The recommendation system 300 may monitor the user's use of the applications 210 installed on the user device 200 and determine a pattern of usage behavior of each application 210. For example, a user 10 may use a specific application (APP A) at location B daily around 11 am. Therefore, the recommendation system 300 may recommend that specific application (APP A) as a recommended application 222 to be shown in the recommendation bar 220 every day, at or before 11 am. In some examples, the user 10 starts the GOOGLE® map application when the user device 200 is either connected to the vehicle's BLUETOOTH®, when the user device 200 is moving in a vehicle, and/or every day at a specific time (e.g., 8 am and 5 pm). In such an instance, the recommendation device 300 recommends the GOOGLE® map application 222 to be included in the recommendation bar 220 when one or more of the criteria listed are satisfied. The recommendation system 300 may use contextual information 324 of one or more users 10 to determine the recommended applications 222 for a specific user 10.

In some implementations, the recommendation system 300 recommends a recommended application 210, 222 to the user 10 based on the entity type of the received notification 206. The entity type defines the type of the content of the notification 206. As previously mentioned, the notification 206 may be associated with an entity type, e.g., text, audio, picture, video, or location (e.g., coordinate location or global positioning system (GPS) location). In some examples, if the recommendation system 300 determines that the notification 206 includes a video or a link to a video (e.g., a YOUTUBE® link), then the recommendation system 300 may recommend an application 222 capable of playing the video or the YOUTUBE® application 222 to be included in the recommendation bar 220. In some examples, the notification 206 may include a location that includes GPS coordinates. In this case, the recommendation system 300 recommends a map display application 222, such as the GOOGLE® map application 222 to be included in the recommendation bar 220.

The recommendation system 300 may recommend a recommended application 210, 222 to the user 10 based on received notifications 206 and/or application co-occurrence (i.e., usage data of a user 10 using applications 210 subsequently and sequentially) and/or contextual information. The recommendation system 300 retrieves/receives usage data 322 and contextual information 324 and determines a pattern of behavior (e.g., contextual information 324). A recommendation of recommended applications 222 based on co-occurrences of applications 210 may be based on monitoring an application 210 being used within a threshold time (T) after a specific application 210. Recommendations based on contextual information 324 may be based on contextual change. For example, if the user 10 has a habit or pattern of using the UBER® application to go home followed by the GRUBHUB® application, the recommendation system 300 may suggest the GRUBHUB® application based on an application co-occurrence of the user 10 using the GRUBHUB® application to order food right after using the UBER® application to be driven home from work. Thus, the recommendation system 300 shows the GRUBHUB® application in the recommendation bar 220 as a recommended application 222 when the user 10 selects the UBER® application. The recommendation system 300 may show the GRUBHUB® application (i.e., the co-occurrence recommendation) for a threshold period of time and then replace it with contextual recommended applications 222 based on contextual information 324.

In some implementations, the recommendation system 300 uses usage data 322 and/or contextual data 324 of multiple users 10 to make recommendations of applications 210. When the user 10 first installs an application 210 on his/her device 200, the recommendation system 300 may not have enough usage data 322 to determine what applications 210 to recommend for use after the recently installed application 210. In such a situation, the recommendation system 300 may use usage data 322 of other users 10 who have used the recently installed application 210. In some examples, the recommendation system 300 clusters users 10 having a number of similar attributes (e.g., applications 210) as the user 10, and determines the recommended applications 222 based on the users 10 having the similar attributes. When the recommendation system 300 collects enough usage data 322 of the user 10, the recommendation system 300 may only consider the usage data 322 of the user 10, and not the group of users 10 having similar attributes. In addition, the group usage data may be used to recommend applications 210 to the user 10 that he/she does not have installed on the user device 200. In some examples, the user device 200 displays a small icon indicating that the application 210 is not installed on the user device 200.

FIGS. 3A-3D show example recommendation bars 220 displayed by example user devices 200. In some implementations, the display 202 of the user device 200 includes a home screen 230. The home screen 230 includes links 224, 234 displayed as icons 232 associated with applications 210 installed on the user device 200. Each link 224, 234 may be selectable by the user 10 and has an access mechanism that has a reference to the corresponding application 210 and indicates a performable operation for the corresponding recommended application 222.

Access mechanisms may include at least one of a native application access mechanism (hereinafter "application access mechanism"), a web access mechanism, and an application download mechanism. The user device 200 may use the access mechanisms to access functionality of applications 210. For example, the user 10 may select a user selectable link 224, 234 on the home screen 230 or other screens including an access mechanism in order to access functionality of an application 210 indicated in the user selectable link 224, 234.

An application access mechanism may be a string that includes a reference to a native application and indicates one or more operations for the user device 200 to perform. If a user 10 selects a user selectable link 224, 234 including an application access mechanism, the user device 200 may launch the native application 210 referenced in the application access mechanism and perform the one or more operations indicated in the application access mechanism.

An application access mechanism includes data that the user device 200 can use to access functionality provided by a native application 210. For example, an application access mechanism can include data that causes the user device 200 to launch a native application 210 and perform a function associated with the native application 210. Performance of a function according to the access mechanism may set the native application 210 into a specified state. Accordingly, the process of launching a native application 210 and performing a function according to an application access mechanism may be referred to herein as launching the native application 210 and setting the native application 210 into a state that is specified by the application access mechanism. In some examples, an application access mechanism for a restaurant reservation application can include data that causes the user device 200 to launch the restaurant reservation application and assist in making a reservation at a restaurant. In such examples, the restaurant reservation application may be set in a state that displays reservation information to the user 10, such as a reservation time, a description of the restaurant, and user reviews. In additional examples, an application access mechanism for an internet media player application can include data that causes the user device 200 to launch the internet media player application and stream media from the Internet. In such examples, the internet media player application may be set in a state that displays information regarding the media (e.g., music) being streamed, such as a song name, an artist, or an album name.

Application access mechanisms may have various different formats and content. The format and content of an application access mechanism may depend on the native application 210 with which the application access mechanism is associated and the operations that are to be performed by the native application 210 in response to selection of the application access mechanism. For example, an application access mechanism for an internet music player application may differ from an application access mechanism for a shopping application. An application access mechanism for an internet music player application may include references to musical artists, songs, and albums, for example. The application access mechanism for an internet music player application may also reference operations, such as randomizing a list of songs and playing a song or album. An application access mechanism for a shopping application may include references to different products that are for sale. The application access mechanism for the shopping application may also include references to one or more operations, such as adding products to a shopping cart and proceeding to a checkout.

Figure 3C:
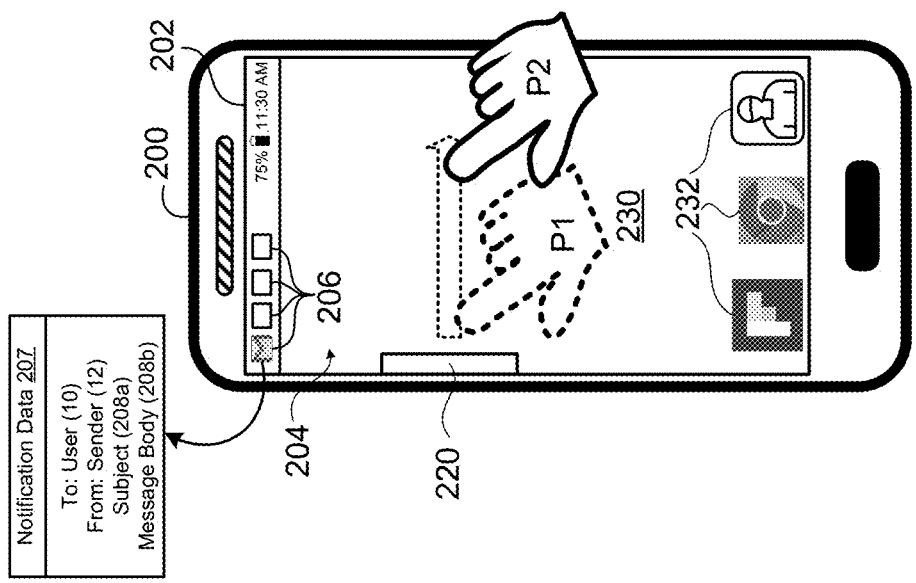

As shown in FIGS. 3A and 3B, in some implementations, the recommendation bar 220 is displayed on the bottom portion of the screen 202. However, the recommendation bar 220 may be displayed anywhere else on the screen 202. As shown in FIG. 3A, the recommended applications 222a-222d are displayed. Due to receiving an email notification 206, e.g., GMAIL®, the recommendation system 300 updates the recommendation bar 220 to include the GMAIL® application as shown in FIG. 3B. FIG. 3B shows the updated recommendation bar 220 having a recommended application 222e replacing the recommended application of FIG. 3A. In another implementation, as shown in FIG. 3C, the recommendation bar 220 may be hidden and the user 10 has to swipe his/her finger from a first position P1 to a second position P2 to view the recommended applications 222 (i.e., the respective icons), as shown in FIG. 3D. If the recommendation system 300 determines that the notification data 207, i.e., the email content, includes data that may trigger the recommendation system 300 to recommend another application 210, then the recommendation system 300 may recommend more than one application 210 (the GMAIL® application 222e).

Figure 4:
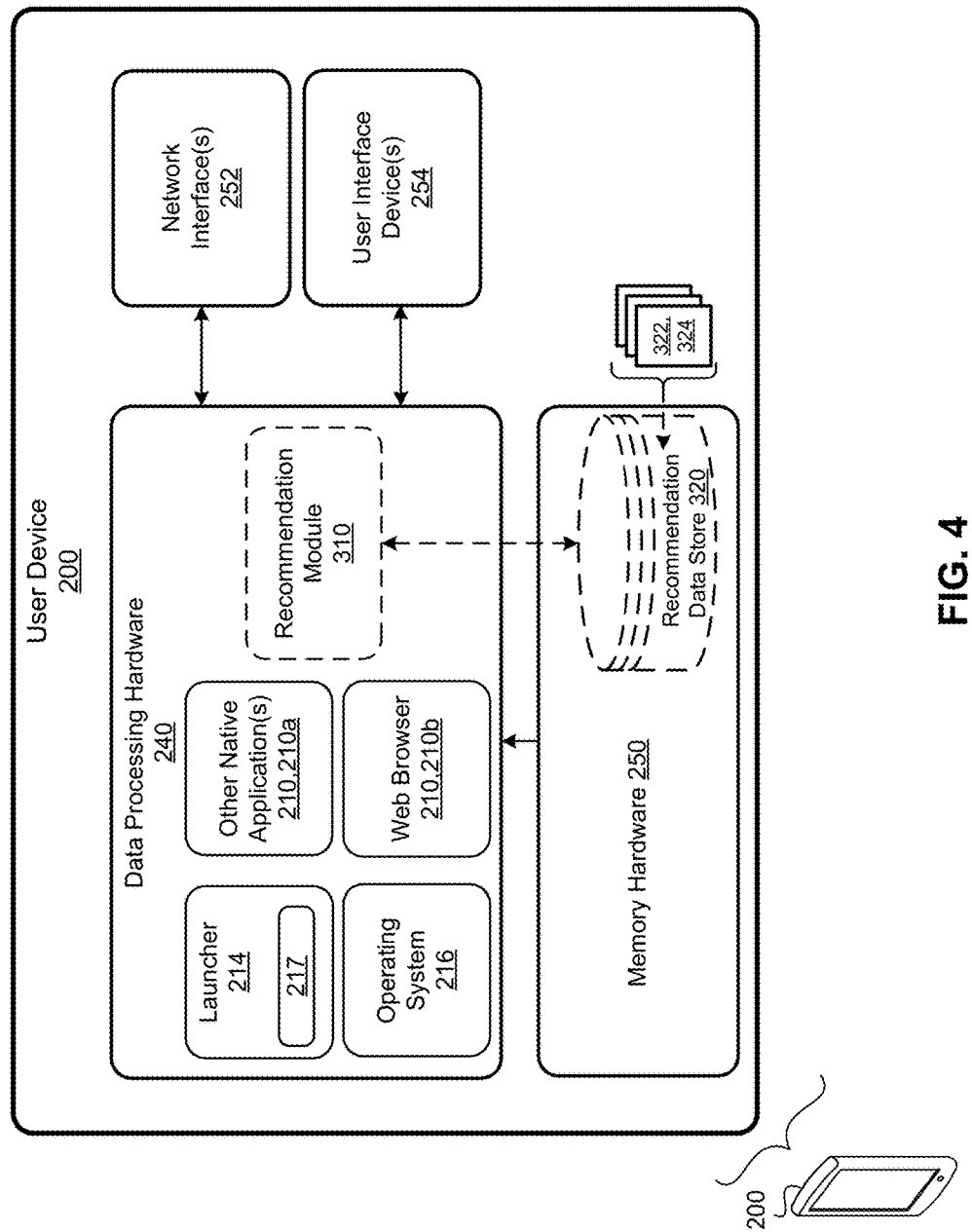
FIG. 4 is a schematic view of an example user device.

FIG. 4 illustrates an example user device 200 including data processing hardware 240 in communication with memory hardware 250, a network interface device 252, and a user interface device 254 (e.g. screen). The user device 200 may include other components as well. The data processing hardware 240 is configured to execute instructions stored on the memory hardware 250 that when executed on the data processing hardware 240 cause the data processing hardware 240 to perform operations. In some examples, the data processing hardware 240 executes one or more of a native application 210a, a web browser 210b, and an operating system 216, all of which may be embodied as computer readable instructions. The operating system 216 may act as an interface between the data processing hardware 240 and the applications 210.

In some implementations, the data processing hardware 240 executes a recommendation launcher 214 configured with a launcher module 217. The launcher module 217 is a set of computer readable instructions embedded in a native application 210a, i.e., the recommendation launcher 214. In the example shown, the data processing hardware 240 executes the recommendation module 310 and the storage device 250 includes the recommendation data store 320. In other examples, the recommendation data store 320 is located remotely from the user device 200.

The memory hardware 250 may be physical devices used to store programs (e.g., sequences of instructions) or data (e.g., program state information) on a temporary or permanent basis as non-transitory memory for use by a computing device. For example, the memory hardware 250 may store the computer readable instructions that make up the native applications 210a, the web browser 210b, the operating system 216, the recommendation launcher 214, and/or the recommendation module 310. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), and phase change memory (PCM). The network interface device 252 includes one or more devices configured to communicate with the network 120.

The network interface 252 can include one or more transceivers for performing wired or wireless communication. Examples of the network interface 252 include, but are not limited to, a transceiver configured to perform communications using the IEEE 802.11 wireless standard, an Ethernet port, a wireless transmitter, and a universal serial bus (USB) port. The user interface 254 includes one or more devices that receive input from and/or provide output to a user 10. The user interface 254 can include, but is not limited to, a touchscreen, a display, a QWERTY keyboard, a numeric keypad, a touchpad, a microphone, and/or speakers.

Figure 5:
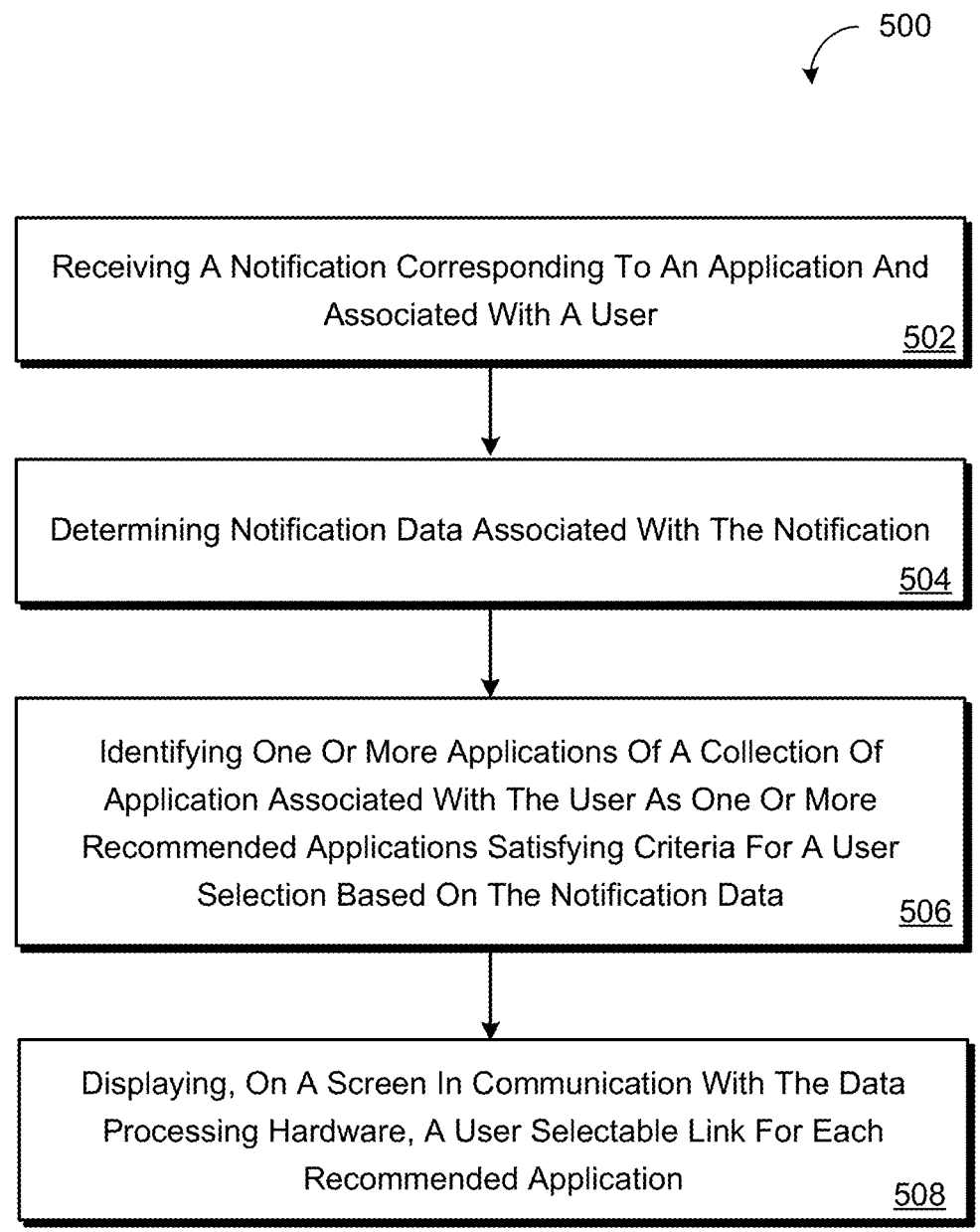
FIG. 5 is an example arrangement of operations for a method of recommending applications for display in a recommendation bar of a user display.

FIG. 5 provides an example arrangement of operations for a method 500 of recommending applications 210, 222 (e.g., recommended applications 222) displayed in a recommendation bar 220 of a user device display 202. The method 500 is described with respect to the user device 200 and the recommendation system 300 as illustrated in FIGS. 1-4.

At block 502, the method 500 includes receiving, at data processing hardware (e.g., a user device 200 or a recommendation system 300), a notification 206 corresponding to an application 210 and associated with a user 10. At block 504, the method 500 includes determining, by the data processing hardware, notification data 207 associated with the notification 206. The notification data 207 may include one or more of sender data, receiver data, subject data, and message data. At block 506, the method 500 also includes identifying, by the data processing hardware, one or more applications 210 of a collection of applications 210 associated with the user 10 as one or more recommended application 222 satisfying criteria for a user 10 selection based on the notification data 207. At block 508, the method 500 also includes displaying, on a screen 202 in communication with the data processing hardware, and a user selectable link 224 for each recommended application 222. Each user selectable link 224 is associated with an application access mechanism that has reference to the corresponding recommended application 222 and that indicates a performable operation for the corresponding recommended application 222. In some implementations, the notification 206 includes one or more of an email notification 206, a text message notification 206, a calendar notification 206, and an application notification 206.

In some examples, identifying the one or more applications of the collection of applications 210 as the one or more recommended application 222 satisfying the criteria for the user 10 selection includes identifying, by the data processing hardware, one or more keywords associated with the one or more applications 210 of the collection of applications 210. In addition, identifying the one or more applications 210 of the collection of applications 210 as the one or more recommended application 222e satisfying the criteria for the user selection includes determining, by the data processing hardware, whether the notification data 207 includes the one or more keywords, and identifying the one or more applications 210 as the one or more recommended application 222e when the notification data 207 includes the one or more keywords.

The criteria for the user selection may include having a threshold probability of the user selection within a threshold period of time after receiving the notification 206. In some examples, for each application 210 of the collection of applications 210, the method 500 includes determining, by the data processing hardware, a probability of the user selection of the application 210 within the threshold period of time (T) after receiving the notification 206, and identifying the application 210 as a recommended application 222 when the probability of the user selection of the application 210 satisfies the threshold probability.

In some implementations, the criteria for the user selection includes at least one of a time of day, a day of week, a location, a user device service status, a user device movement status, a device platform, or contextual information. The method 500 may also include determining, by the processing hardware, user behavior patterns with respect to the collection of applications 210 based on the criteria. For each application 210 of the collection of applications 210, the method 500 may include determining, by the processing hardware, a probability of the user selection of the application 210 after receiving the notification 206 based on the user behavior patterns, and identifying, by the data processing hardware, the application 210 as a recommended application 222 when the probability of the user selection of the application 210 satisfies a probability criterion. In some examples, the method 500 further includes determining the probability of the user selection of the application 210 based on user behavior patterns of another user 10. The user behavior patterns include at least one of selecting an application 210 of the collection of applications 210 or performing one or more operations on an application 210 of the collection of applications 210.

The method 500 may also include receiving, at the data processing hardware, an indication of a user selection of one of the one or more user selectable link 224 and executing, at the data processing hardware, the application access mechanism associated with the selected user selectable link 224. The executed application access mechanism associated with the selected user selectable link 224 launches the corresponding recommended application 222 and sets the recommended application 222 to an application state specified by the application access mechanism.

Figure 6:
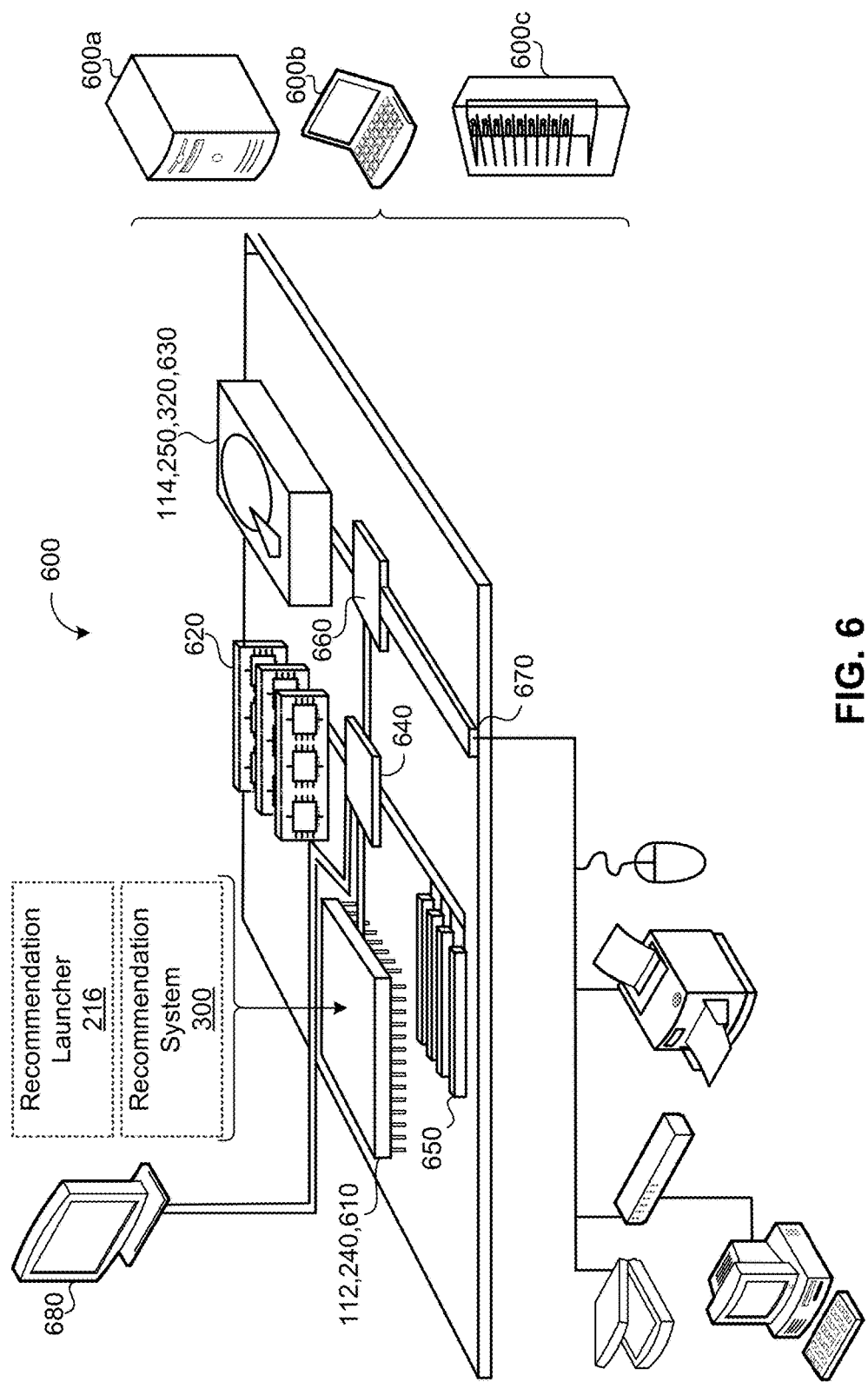
FIG. 6 is a schematic view of an example computing device executing any systems or methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 112, 240, 610, memory 620, a storage device 114, 250, 320, 630, a high-speed interface/controller 640 connecting to the memory 620 and high-speed expansion ports 650, and a low speed interface/controller 660 connecting to low speed bus 670 and storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM).

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and low-speed expansion port 670. The low-speed expansion port 670, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   receiving, at data processing hardware, a notification corresponding to an application and associated with a user;
   determining, by the data processing hardware, notification data associated with the notification, the notification data including one or more of sender data, receiver data, subject data, and message data;
   identifying, by the data processing hardware, one or more applications of a collection of applications associated with the user as one or more recommended applications satisfying criteria for a user selection based on the notification data; and
   displaying, on a screen in communication with the data processing hardware, a user selectable link for each recommended application, each user selectable link associated with an application access mechanism having reference to the corresponding recommended application and indicating a performable operation for the corresponding recommended application.

2. The method of claim 1, wherein the notification includes one or more of an email notification, a text message notification, a calendar notification, and an application notification.

3. The method of claim 1, wherein identifying the one or more applications of the collection of applications as the one or more recommended applications satisfying the criteria for the user selection comprises:
- identifying, by the data processing hardware, one or more keywords associated with the one or more applications of the collection of applications;
- determining, by the data processing hardware, whether the notification data includes the one or more keywords; and
- identifying, by the data processing hardware, the one or more applications as the one or more recommended applications when the notification data includes the one or more keywords.

4. The method of claim 1, wherein the criteria for the user selection comprises having a threshold probability of the user selection within a threshold period of time after receiving the notification.

5. The method of claim 4, further comprising, for each application of the collection of applications:
- determining, by the data processing hardware, a probability of the user selection of the application within the threshold period of time after receiving the notification; and
- identifying, by the data processing hardware, the application as a recommended application when the probability of the user selection of the application satisfies the threshold probability.

6. The method of claim 1, wherein the criteria for the user selection comprises at least one of a time of day, a day of week, a location, a user device service status, a user device movement status, a device platform, or contextual information.

7. The method of claim 6, further comprising:
- determining, by the data processing hardware, user behavior patterns with respect to the collection of applications based on the criteria; and
- for each application of the collection of applications:
  - determining, by the data processing hardware, a probability of the user selection of the application after receiving the notification based on the user behavior patterns; and
  - identifying, by the data processing hardware, the application as a recommended application when the probability of the user selection of the application satisfies a probability criterion.

8. The method of claim 7, further comprising determining the probability of the user selection of the application based on user behavior patterns of another user.

9. The method of claim 7, wherein the user behavior patterns comprise at least one of selecting an application of the collection of applications or performing one or more operations on an application of the collection of applications.

10. The method of claim 1, further comprising:
- receiving, at the data processing hardware, an indication of a user selection of one of the one or more user selectable links; and
- executing, at the data processing hardware, the application access mechanism associated with the selected user selectable link,
- wherein the executed application access mechanism associated with the selected user selectable link launches the corresponding recommended application and sets the recommended application to an application state specified by the application access mechanism.

11. A system comprising:
data processing hardware; and
memory hardware in communication with the data processing hardware, the memory hardware storing instructions that when executed on the data processing hardware cause the data processing hardware to perform operations comprising:
- receiving a notification corresponding to an application and associated with a user;
- determining notification data associated with the notification, the notification data including one or more of sender data, receiver data, subject data, and message data;
- identifying one or more applications of a collection of applications associated with the user as one or more recommended applications satisfying criteria for a user selection based on the notification data; and
- displaying, on a screen in communication with the data processing hardware, a user selectable link for each recommended application, each user selectable link associated with an application access mechanism having reference to the corresponding recommended application and indicating a performable operation for the corresponding recommended application.

12. The system of claim 11, wherein the notification includes one or more of an email notification, a text message notification, a calendar notification, and an application notification.

13. The system of claim 11, wherein identifying the one or more applications of the collection of applications as the one or more recommended applications satisfying the criteria for the user selection comprises:
- identifying one or more keywords associated with the one or more applications of the collection of applications;
- determining whether the notification data includes the one or more keywords; and
- identifying the one or more applications as the one or more recommended applications when the notification data includes the one or more keywords.

14. The system of claim 11, wherein the criteria for the user selection comprises having a threshold probability of the user selection within a threshold period of time after receiving the notification.

15. The system of claim 14, wherein the operations further comprise, for each application of the collection of applications:
- determining a probability of the user selection of the application within the threshold period of time after receiving the notification; and
- identifying the application as a recommended application when the probability of the user selection of the application satisfies the threshold probability.

16. The system of claim 11, wherein the criteria for the user selection comprises at least one of a time of day, a day of week, a location, a user device service status, a user device movement status, a device platform, or contextual information.

17. The system of claim 11, wherein the operations further comprise:
- determining user behavior patterns with respect to the collection of applications based on the criteria; and
- for each application of the collection of applications:
  - determining a probability of the user selection of the application after receiving the notification based on the user behavior patterns; and
  - identifying the application as a recommended application when the probability of the user selection of the application satisfies a probability criterion.

18. The system of claim 17, wherein the operations further comprise determining the probability of the user selection of the application based on user behavior patterns of another user.

19. The system of claim 17, wherein the user behavior patterns comprise at least one of selecting an application of the collection of applications or performing one or more operations on an application of the collection of applications.

20. The system of claim 11, wherein the operations further comprise:
- receiving an indication of a user selection of one of the one or more user selectable links; and
- executing the application access mechanism associated with the selected user selectable link,
- wherein the executed application access mechanism associated with the selected user selectable link launches the corresponding recommended application and sets the recommended application to an application state specified by the application access mechanism.

* * * * *